June 22, 1926.
R. HARRISON
1,589,848
METHOD OF MAKING AND MEANS FOR SUPPORTING ARTIFICIAL FLOWERS AND THE LIKE
Filed Jan. 4, 1926
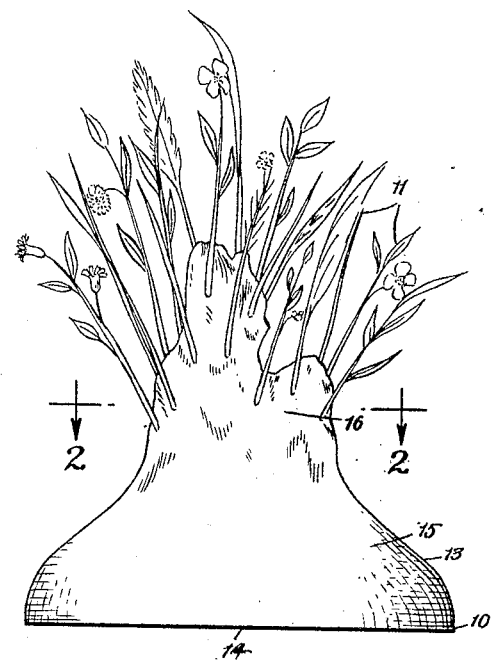
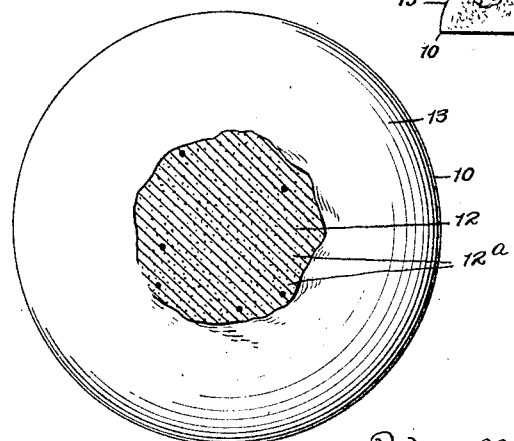
INVENTOR
Rebecca Harrison
BY
W. T. Criswell.
ATTORNEY Patented June 22, 1926.

1,589,848

UNITED STATES PATENT OFFICE.

REBECCA HARRISON, OF NEW YORK, N. Y.

METHOD OF MAKING AND MEANS FOR SUPPORTING ARTIFICIAL FLOWERS AND THE LIKE.

Application filed January 4, 1926. Serial No. 79,117.

This invention relates more particularly to a class of ornamental mountings.

My invention has for its object primarily to provide a base or support and process of making the same for mounting artificial flowers, especially those made of fish shells, and also for leaves, fruit, etc., whereby they may be assembled in groups representing bouquets or mounds simulating the flowers in natural growth formations and other fanciful forms for decorative use in homes and elsewhere, instead of arranging the flowers in vases and separate holders.

The invention consists essentially of the production of a base from plastic material which may be of a class capable of being formed into various novel and artistic shapes adapted to be self-standing, and in which the stems of the flowers, fruit and associate shrubbery are embedded in selective arrangement while the material is in a condition of plasticity. The plastic material may be mineral wax, such as paraffin with which is mixed a substance for rendering weight and hardness, and a portion or all of the exterior of the base may be attractively ornamented by providing thereon colored designs or by softening with heat the surface of the base and then applying artificial grass, moss, etc.

A further object of the invention is to provide a method and means for supporting artificial flowers and the like of a simple and efficient character which may be made in appropriate sizes and shapes.

With these and other objects in view, the invention will be hereinafter more fully explained with reference to the accompanying drawing forming a part of this specification in which similar characters of reference indicate corresponding parts in all the views, and will then be pointed out in the claims at the end of the descripton.

In the drawing, Figure 1 is an elevation of one form of base made according to my improved method, and which shows the manner of its use for supporting artificial flowers.

Fig. 2 is a sectional plan view taken on the line 2—2 of Fig. 1, and

Fig. 3 is a fragmentary view showing a reduced elevation of part of a decorated form of the base.

In carrying the invention into practice I provide a base, as 10, which serves as means for supporting artificial flowers or fruit with appropriate shrubbery, as 11, and especially flowers made of fish scales. The base 10 may be made of any suitable plastic, or cementitious material, though I prefer to use a mineral wax, such as paraffin 12 owing to its relatively tough pliable texture and because of its susceptibility of being melted when contacted by a flame, while not being ordinarily meltable when subjected to quite warm atmospheric temperature as is incident to many other kinds of wax. Since paraffin is comparatively light in weight I prefer to use in conjunction therewith a quantity of fine particles of gravel $12^a$, such as sand which is free from earth and other foreign substances, to render hardness and weight to the paraffin, and an effectual formula for making the base consists of paraffin, approximately one-quarter by weight and gravel sand, approximately three-quarters by weight. In the preparation of the materials the paraffin is suitably melted, and the sand is thoroughly mixed with the paraffin during its congealing stages while cooling so that the sand will be incorporated by being held in suspension in all portions of the paraffin.

The base 10 may be of any appropriate shape and size having a body part, as 13, which may be partially spherical to provide a flat underside, as 14, for allowing the base to be self-standing and to provide a somewhat mound shape upper face, as 15, from the central part of which may be upwardly disposed protrusions, as 16, of irregular shapes. In the process of forming or molding the base the work is accomplished by fashioning the material while in a stage of plasticity to provide the body part 13 and protrusions 16, and during the formations of these parts the free ends of the stems of the flowers and shrubbery are embedded in the surface and subsurface of the protrusions or in all parts of the upper face of the body part 13 of the base. The flowers and shrubbery may be selectively arranged to simulate a bouquet, or a mound with a growth of the flowers or any other desired design, and in instances the body part of the base may be ornamentally fashioned and colored in plain and attractive artistic designs. The sheen of the particles of gravel will if made accordingly appear in glistening crystals on the surface of the base. Also by melting or softening the surface of the base by the use of a flame artificial moss or grass, as 17, together with pebbles, as 18, may be embedded in the portion of the base around the stems of the flowers or on all parts of the upper face of the base, as shown in Fig. 3, in order to give the flowers and shrubbery the appearance of natural growth. Thus by the use of this method and means artificial flowers may be advantageously employed for decorating purposes without the use of vases and similar separate holders.

In the foregoing description, I have embodied the preferred form of my invention, but I do not wish to be understood as limiting myself thereto, as I am aware that modifications may be made therein without departing from the principle or sacrificing any of the advantages of this invention, therefore, I reserve to myself the right to make such changes as fairly fall within the scope thereof.

Having thus described my invention, I claim as new and desire to secure by Letters Patent:—

1. The method of supporting artificial flowers and the like, which consists of forming in a fanciful design a self-standing base of a mixture of meltable plastic material and a substance for rendering hardness and weight to the base and in which the stems of the flowers are embedded in a portion thereof in selective arrangement during the fashioning of the base from the material while in a condition of plasticity, then melting a film portion of the surface of the base surrounding the flower stems and applying to the melted film portion selective decorative articles.

2. A means for supporting artificial flowers and the like, comprising a base of paraffin and particles of gravel, said base having a body with a flat underside and having an upper face in a portion of which the stems of the flowers are embedded in selective arrangement, and decorative mediums also embedded in the upper face of the body surrounding the flower stems.

This specification signed and witnessed this 2nd day of January, A. D. 1926.

REBECCA HARRISON.